Figure 1:
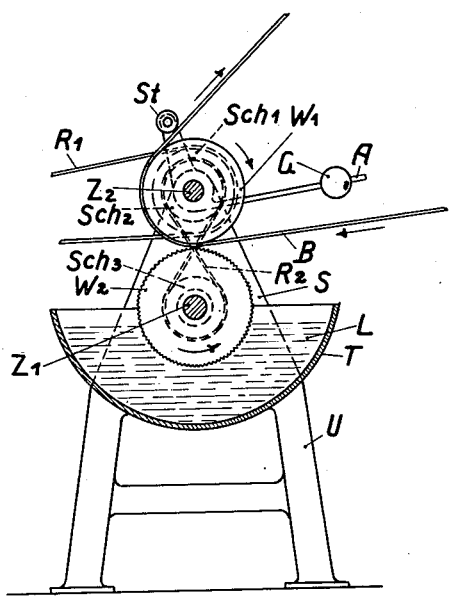

Feb. 10, 1942.  A. FISCHL  2,272,662
PROCESS AND APPARATUS FOR THE PRODUCTION OF AN EXTREMELY THIN
FILM OF CELLULOSE ESTER OR THE LIKE
Filed Nov. 3, 1936

Patented Feb. 10, 1942

2,272,662

UNITED STATES PATENT OFFICE 2,272,662

**PROCESS AND APPARATUS FOR THE PRO-
DUCTION OF AN EXTREMELY THIN FILM
OF CELLULOSE ESTER OR THE LIKE**

Alfred Fischl, Dresden, Germany

Application November 3, 1936, Serial No. 109,046
In Germany November 13, 1935

4 Claims. (Cl. 18—57)

This invention relates to the production of extremely thin film from a cellulose ester or the like which is capable of being used in various situations but particularly in the manufacture of electrical condensers.

In the manufacture of electrical condensers for use in both wire and wireless telegraphy tin foil layers alternate with the insulating layers. A desired object has been to make such insulating layers of particularly thin sheets so as not to increase the bulk of the condensers excessively since hundreds of layers are often superposed.

Inasmuch as films produced from cellulose esters or the like have been found to be suitable as insulating means in condensers such films have been made as thin as possible. This can be done by the well known pouring method but only with the greatest difficulty and the use of the greatest skill. Furthermore such manufacture involved a very slow rotation of the rollers since the extremely fine passage or slit for the film liquid was very easily dislocated.

An object of the present invention is to improve the method and the apparatus for manufacturing suitably thin films. In order to accomplish this the solution containing the cellulose ester or the like is applied by a roller having its surface finely engraved, grooved or roughened upon a smooth support or base upon which the cellulose ester coalesces or runs together to form a uniform layer. Such uniform layer is removed after setting from the smooth support.

A further object of the invention is to apply the cellulose layer upon the smooth support in such an extremely thin layer and so uniformly that such layer will coalesce instantly. Such layer is so thinly fluid as to run together practically immediately.

It has been found that when use is made of a roller which is provided with the finest engraving, roughening, grooves or the like with a specially thin solution of cellulose ester or other plastic substance that the solution can be applied perfectly distributed on the smooth support or base and that the impressions produced by the engraving, roughening, grooves or the like will at once disappear through the coalescence of the thin solution. This result is accomplished even when extremely thin or haze thin applications are made.

In the present invention the roller provided with the fine engraving, roughening, grooves or the like serves only as an engaging or transmitting means for the extremely thin solution which, after being applied at once coalesces with the disappearance of the pattern. In this way the main object of applicant's invention is secured, namely, the production of an extremely thin layer which does not show a pattern but is entirely uniform.

A further object of the invention is to promote the coalescence referred to above by means of the application of a smooth roller or the like which is pressed against the support or base behind the point of application thereto of the cellulose ester solution.

A further object of the invention is to provide a support or base for the solution which is insensitive to the action of the solvent of the film solution used.

Figure 2:
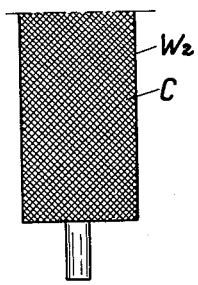

With these and other objects which will become apparent from the detailed explanation below the invention is explained with reference to the accompanying drawing in which Figure 1 is a transverse vertical section illustrating a preferred form of apparatus for carrying the invention into effect; and Figure 2 is a partial plan view illustrating the fine engravings or roughening upon the applying roller.

In the drawing the trough T is supported upon the frame U. The bearings for the spindles $Z_1$ and $Z_2$ of the rollers $W_2$ and $W_1$ respectively are mounted in the lateral supporting members S extending upwardly from the base U.

The roller $W_1$ which is a smooth roller is driven by means of the belt $R_1$ from a source of power not shown. The belt $R_1$ drives the belt pulley $Sch_1$ mounted on the shaft $Z_2$. The roller $W_2$ is driven by means of the belt pulleys $Sch_2$ and $Sch_3$ and the belt $R_2$ from the roller $W_1$.

A support or base strip B which is maintained in a state of tension by means of rollers not shown in the drawing passes over the roller $W_1$ in the direction indicated by the arrows. Shortly after leaving the roller $W_1$ the strip B is contacted by the roller $St$ which is oscillatably mounted upon the shaft $Z_2$ and which may be regulated as to its pressure against the strip B by means of the weight G slidably mounted on the arm A integrally connected with the arms supporting the roller $St$.

The cellulose ester together with its solvent is shown at L in the trough T. The roller $W_2$ rotates in the direction of the arrow and is immersed in the solution. The periphery of the roller $W_2$ is provided with a fine engraving or roughening such as shown at C in Figure 2. The extremely thin fluid solution is carried along by the roller $W_2$ and applied on the smooth supporting member or strip B. Preferably the strip B consists of a Celluloid film which is impervious to the action of the solution L. As mentioned above the supporting strip passes over the counter roller W₁ and then with the solution thereon comes into contact with the roller St which aids in coalescing the film material on the strip B. Coalescence however takes place without the action of the roller St and such roller is merely an aid so as to permit possibly quicker coalescence.

Upon leaving the roller W₁ the supporting member B with the extremely thin film application thereon may be passed through a precipitating liquid or through a drying chamber so as to effect or accelerate the solidification or the setting of the applied solution.

The removal of the extremely thin film from the supporting member B is attended with no difficulty and may be done by winding on a special reel for future use in the production of electrical condensers for instance. As is obvious a gear or chain drive may be substituted for the belt drives described above.

As is obvious from the above description also all slits or narrow crevices which are extremely subject to clogging in this art have been eliminated. Also scrapers or smoothing knives have been eliminated thereby at the same time eliminating the disadvantages thereof mainly due to the relatively fast solidification of cellulose solutions since the solvents as a rule are extremely volatile.

As will be noted from the above description the cellulose ester solution or the like which is applied is applied in extremely numerous and closely adjacent points upon the supporting member so that the coalescing of these numerous minute points will cause the formation of an extremely thin and uniform film. It is essential in the application of the invention that the thin cellulose ester solution be applied in a very small quantity upon the smooth support and also that the individual particles of the solution as so applied be so close together that immediately after application and before setting begins to take place they coalesce to an extremely thin uniform layer. These two essentials are accomplished by the invention since the applying roller W₂ need only be provided with fine engravings, roughenings, grooves or the like so that in the first place it will only carry along a very small portion of the solution and in the second place will deliver the solution in the form of closely adjacent particles on the surface of the supporting base or member B. As will be noted the invention herein involved is not the application of an adhesive layer at distributed points upon a fabric for instance but is directed to the formation of a uniform film. The invention therefore has no relation to the application of an adhesive surface or layer upon a base so as to form a laminated construction. It might be pointed out that in the formation of laminated structures it is not necessary or essential that the adhesive particles coalesce which is a very essential feature of applicant's invention since otherwise the films formed would be entirely unsuitable for use in for instance electrical condensers.

I claim:

1. A process for the production of thin films of cellulose esters or the like comprising applying a thin solution of a cellulose ester upon a smooth support which is insensitive to the solvent of the said solution, by the contact with the said support of a hard recessed surface carrying the solution in finely divided and evenly distributed equal quantities, then allowing the individual quantities thus deposited on said support to coalesce to form a uniform layer, rolling said individual quantities to aid the coalescing thereof, and then removing said layer from said support.

2. A process for the production of thin films of cellulose esters or the like comprising applying a thin solution of a cellulose ester upon a smooth moving support which is insensitive to the solvent of the said solution, by the contact with the said support of a hard recessed surface carrying the solution in finely divided and evenly distributed equal quantities, then allowing the individual quantities thus deposited on said support to coalesce to form a uniform layer, rolling said individual quantities to aid the coalescing thereof, and then removing said layer from said support.

3. Apparatus for producing thin layers of cellulose esters or the like comprising a smooth moving support insensitive to the solvent of the said solutions and means comprising a roller having a hard recessed surface comprising a plurality of finely divided and evenly distributed recesses of equal capacity adapted to receive the solution and to contact with the said support so as to deposit the solution on said support in finely divided evenly distributed equal quantities, a roller to aid the coalescing of the individual quantities of solution on said support, and means for removing the resulting layer from said support.

4. Apparatus for producing thin layers of cellulose esters or the like comprising a trough containing a solution of a cellulose ester or the like, a smooth moving support insensitive to the solvent of the said solutions, and means comprising a roller adapted to dip into the solution in the said trough, said roller having a hard recessed surface comprising a plurality of finely divided and evenly distributed recesses of equal capacity adapted to receive the solution and to contact with the said support so as to deposit the solution on said support in finely divided evenly distributed equal quantities, a roller to aid the coalescing of the individual quantities of solution on said support, and means for removing the resulting layer from said support.

ALFRED FISCHL.